United States Patent [19]
Davies et al.

[11] Patent Number: 6,163,381
[45] Date of Patent: Dec. 19, 2000

[54] DUAL SENSOR ATMOSPHERIC CORRECTION SYSTEM

[75] Inventors: Donald W. Davies, Torrance; Mark Slater, Manhattan Beach; Richard A. Hutchin, Calabasas, all of Calif.

[73] Assignee: TRW Inc., Redondo Beach, Calif.

[21] Appl. No.: 09/257,162

[22] Filed: Feb. 24, 1999

[51] Int. Cl.$^7$ .................................................. G01B 9/02
[52] U.S. Cl. ............................................................ 356/521
[58] Field of Search .................................... 356/353, 354; 250/201.9

[56] References Cited

U.S. PATENT DOCUMENTS

| | | | |
|---|---|---|---|
| 4,518,854 | 5/1985 | Hutchin | 250/201 |
| 4,696,573 | 9/1987 | Hutchin | 356/353 |
| 5,026,977 | 6/1991 | Hubbard, Jr. | 250/201.9 |
| 5,384,455 | 1/1995 | Paxman | 250/201.9 |
| 5,745,309 | 4/1998 | Salmon . | |

OTHER PUBLICATIONS

Tyson, Robert K., "Wavefront Sensing", *Principles of Adaptive Optics*, pp. 140–171, 2nd Edition, Academic Press, 1991.

Wallner, Edward P., "Optimal wave–front correction using slope measurements", *Journal of the Optical Society of America*, vol. 73, Dec. 1983.

Hudgin, Richard H., "Optical wave–front estimation", *Journal of the Optical Society of America*, vol. 67, Mar. 1977.

Hudgin, Richard H., "Wave–front reconstruction for compensated imaging", *Journal of the Optical Society of America*, vol. 67 Mar. 1977.

Wallner, Edward P., "Comparison of wavefront sensor configurations using optical reconstruction and correction", *Wavefront Sensing*, Proc. SPIE vol. 351, 1982.

Noll, Richard J., "Phase estimates from slope–type waterfront sensors", *Journal of the Optical Society of America*, vol. 68(1), Jan. 1978.

Fried, David L. "Least–square fitting a wave–front distortion estimate to an array of phase–difference measurements", *Journal of the Optical Society of America*,, vol. 67(3), Mar. 1977.

Hudgin, Richard H. "Wave–front reconstruction for compensated imaging", *Journal of the Optical Society of America*, vol. 67(3), Mar. 1977.

*Primary Examiner*—Robert Kim
*Assistant Examiner*—Phil Natividad
*Attorney, Agent, or Firm*—Michael S. Yatsko

[57] ABSTRACT

A dual sensor wavefront correction system is adaptable to correcting wavefronts including wavefronts that are severely scintillated. The system includes a Hartmann wavefront sensor as well as a unit shear lateral shearing interferometer (LSI) wavefront sensor. The optical output signals from the Hartmann wavefront sensor are applied to a real reconstructor which provides an estimation of the distortion in the wavefront during most conditions except for conditions of severe turbulence. In order to provide compensation for the phase discontinuities in a scintillated wavefront, a unit shear lateral shearing interferometer (LSI) wavefront sensor is provided. The optical output signals from the unit shear LSI wavefront sensor are processed by a complex reconstructor in order to provide relatively accurate estimates of the tilt signals at the discontinuities. The output of the real reconstructor and the complex reconstructor are combined in a synergistic manner to provide a composite correction signal to the actuators of a deformable mirror. As such, the wavefront correction system has a relatively wide dynamic range and is not blind to discontinuities in the wavefronts as a result of turbulence. A steering mirror may also be provided to optimize the dynamic range of the deformable mirror.

5 Claims, 8 Drawing Sheets

| $X_{00}$ | 0 |
| $X_{10}$ | 0 |
| $Y_{00}$ | $Y_{01}$ |

DUAL SENSOR ATMOSPHERIC CORRECTION SYSTEM

The U.S. Government has certain rights in this invention pursuant to the clause at FAR 52.227–12.

BACKGROUND OF THE INVENTION

1. Technical Field of the Invention

The present invention relates to an optical wavefront correction system and a method for correcting relatively severe wavefront distortions due to, for example, turbulence and more particularly to dual sensor wavefront correction system which includes a Hartmann wavefront sensor, a unit shear lateral shearing interferometer (LSI), a processing subsystem and a deformable mirror in which the processing subsystem processes the output signals from the dual sensors in a synergistic manner to form a composite correction signal that is applied to the deformable mirror resulting in a wavefront correction system with improved accuracy and dynamic range relative to known wavefront correction systems.

2. Description of the Prior Art

Optical signals are known to be distorted when passed through a time varying in-homogeneous medium, such as a turbulent atmosphere, ocean or biological tissue. Various adaptive optics systems are known which compensate the distortion in a wavefront during certain known conditions. Such adaptive optics systems normally include one or more wavefront sensors for estimating the distortion of a wavefront of an optical signal. These distortion estimates are used to generate correction signals which, in turn, are fed to the actuators of a deformable mirror in order to correct for the wavefront distortion.

Various wavefront sensors are known in the art. Such wavefront sensors are known to have limitations during certain conditions. Both unit shear lateral shearing interferometer (LSI) wavefront sensor and Hartmann wavefront sensors are extremely well known in the art. Such wavefront sensors are disclosed, for example, in "Principles of Adaptive Optics", 2$^{nd}$ Edition, Robert K. Tyson, Academic Press, 1991, hereby incorporated by reference.

Such sensors are also disclosed in U.S. Pat. No. 4,518,854, also incorporated by reference. In general, Hartmann sensors utilize a mask with a matrix of holes or an array of lenslets, for example, for dividing the wavefront into a matrix of subapertures. Each of the beams in the subapertures is focused onto one or more detectors forming an array of spots on the detectors. The position of the spots provides a direct indication of the wavefront tilt at each subaperture.

In unit shear LSI wavefront sensors, a copy of the wavefront is normally made and shifted in the x-direction by a distance equal to the spacing between actuators on the deformable mirror. The original and shifted beams are interfered in order to find the phase difference there between. The interference pattern is applied to an array of detectors. The intensity of the light provides a measure of the wavefront x-tilt. This is also done with a shear in the y-direction to get the y-tilt.

The output signals from the detectors from both Hartmann and unit shear LSI wavefront sensors are processed to provide tilt signal signals which, in turn, are applied to a plurality of actuators of a deformable mirror to correct for any distortions sensed in the wavefront. In particular, such output signals from such sensors are known to be processed by a so-called real reconstructor which provides relatively accurate results during conditions in which the wavefront phase change between adjacent subaperatures is $\pi$ or less. Examples of real reconstructors are disclosed in: "Optical Wave-Front Correction Using Slope Measurements", by Wallner; Journal of the Optical Society of America, Vol. 73, No. 12, December 1983, pages 1771–1776; "Optimal Wavefront Estimation" by Hudgin, Journal of the Optical Society of America, Vol. 67, No. 3, March 1977, pages 378–382, "Wavefront Reconstruction for Compensated Imaging", by Hudgen, Journal of the Optical Society of America, Vol. 67, No. 3, March 1977, pages 375–378; "Comparison of Wavefront Sensor Configurations Using Optimal Reconstruction and Correction", by Wallner; Proc. SPIE, Vol. 351, 1982, pages 42–53; "Phase Estimates from Slope Type Wavefront Sensors", by Noll, Journal of the Optical Society of America, Vol. 68, No. 1, January 1978, pages 139–140. "Least Square Fitting a Wavefront Distortion Estimate to An array of Phase Difference Measurements", by Fried, Journal of the Optical Society of America, Vol. 67, No. 3, March 1977, pages 370–375, all hereby incorporated by reference. However, such real reconstructors are not suitable during conditions in which the wavefront is severely scintillated due to turbulence; conditions in which the distortions are no longer continuous (i.e. conditions in which the wavefront has branch points). During such situations, such wavefront sensors processed by real reconstructors, are blind to branch point discontinuities in the wavefront. As such, wavefront sensors are known to provide rather poor results during such conditions.

There are other problems associated with such wavefront sensors. For example, one problem relates to the sensitivity of such wavefront sensor. In particular, as pointed out in U.S. Pat. No. 4,518,854, a major problem with Hartmann wavefront sensors is the alignment of the optical components and the detector array. Such misalignment can affect the sensitivity and accuracy of such a system. In order to resolve this problem, the '854 patent discloses a combined wavefront sensor which utilizes a Hartmann and an LSI wavefront sensor. The output signals from the two sensors are processed by a real reconstructor, as the generally discussed above, to provide increased sensitivity and accuracy of the wavefront sensor system. Unfortunately, such a system is unable to provide acceptable wavefront correction during conditions when a wavefront is severely distorted by turbulence as discussed above. Thus, there is a need for a wavefront correction system that is able to correct wavefronts that are severely distorted by turbulence.

SUMMARY OF THE INVENTION

Briefly, the present invention relates to an optical wavefront correction system and more particularly to a dual sensor wavefront correction system that is adaptable to correcting wavefronts including wavefronts that are severely scintillated. The system includes a Hartmann wavefront sensor as well as a unit shear lateral shearing interferometer (LSI) wavefront sensor. The optical output signals from the Hartmann wavefront sensor are applied to a real reconstructor which provides an estimation of the distortion in the wavefront during most conditions except for conditions of severe turbulence. Hartmann wavefront sensors processed by real reconstructors are known to have a relatively large dynamic range but, as mentioned above, are blind to branch point discontinuities which can occur during conditions of strong scintillation. In order to provide compensation for the phase discontinuities in a scintillated wavefront, a unit shear lateral shearing interferometer (LSI) wavefront sensor is provided. In accordance with an important aspect of the invention, the optical output signals from the unit shear LSI wavefront sensor are processed by a complex reconstructor, heretofore unknown in such applications, in order to provide relatively accurate estimates of the tilt signals at the discontinuities. The output of the real reconstructor and the complex reconstructor are combined in a synergistic manner to provide a composite signal to the actuators of a deformable mirror. As such, the wavefront correction system in accordance with the present invention has a relatively wide dynamic range and is not blind to discontinuities in the wavefronts as a result of scintillation. A steering mirror may also be provided to optimize the dynamic range of the deformable mirror.

DESCRIPTION OF THE DRAWINGS

These and other benefits of the present invention will be readily recognized by those of ordinary skill in the art with reference to the following specification and attached drawing wherein.

DETAILED DESCRIPTION

The present invention relates to a dual sensor wavefront correction system for correcting distortions in a wavefront resulting from various conditions including conditions when optical signals passing through inhomogeneous mediums are subjected to scintillation. As discussed above, the wavefront distortions during such conditions may result in phase discontinuities of the wavefront. In accordance with the present invention, a Hartmann wavefront sensor is provided and coupled to a real reconstructor in order to provide suitable estimation of the tilts for compensating the wavefront under most conditions. As mentioned above, such wavefront sensors when processed by real reconstructors are virtually blind to phase discontinuities in a wavefront that is severely distorted by scintillation. In accordance with one important aspect of the invention, a unit shear lateral shearing interferometer (LSI) wavefront sensor is provided and processed by a complex reconstructor, heretofore unknown to be used in such an application. The unit shear LSI wavefront sensor and complex reconstructor are able to provide a relatively accurate estimate of the phase discontinuities. Since the dynamic range of the complex reconstructor is limited to ±π radians of wavefront phase, the output of the complex reconstructor is merged with the output of the real reconstructor in a synergistic manner to provide a composite correction signal which has a relatively wide dynamic range and also rather accurately estimates the correction at the phase discontinuities in the wavefront. This composite signal is applied to a deformable mirror which compensates for the distortion in the wavefront.

Deformable mirrors are extremely well known in the art. An example of such a deformable mirror is disclosed in U.S. Pat. No. 5,719,846, hereby incorporated by reference. In order to optimize the correction range of the deformable mirror a steering mirror may be provided. In particular, a portion of the composite actuator signal may be provided to the steering mirror to enable the steering mirror to provide some correction in order to optimize the correction range of the deformable mirror. In addition, as discussed in U.S. Pat. No. 5,745,309, the steering mirror may also be used for accurately aiming the wavefront at the deformable mirror.

Figure 1:
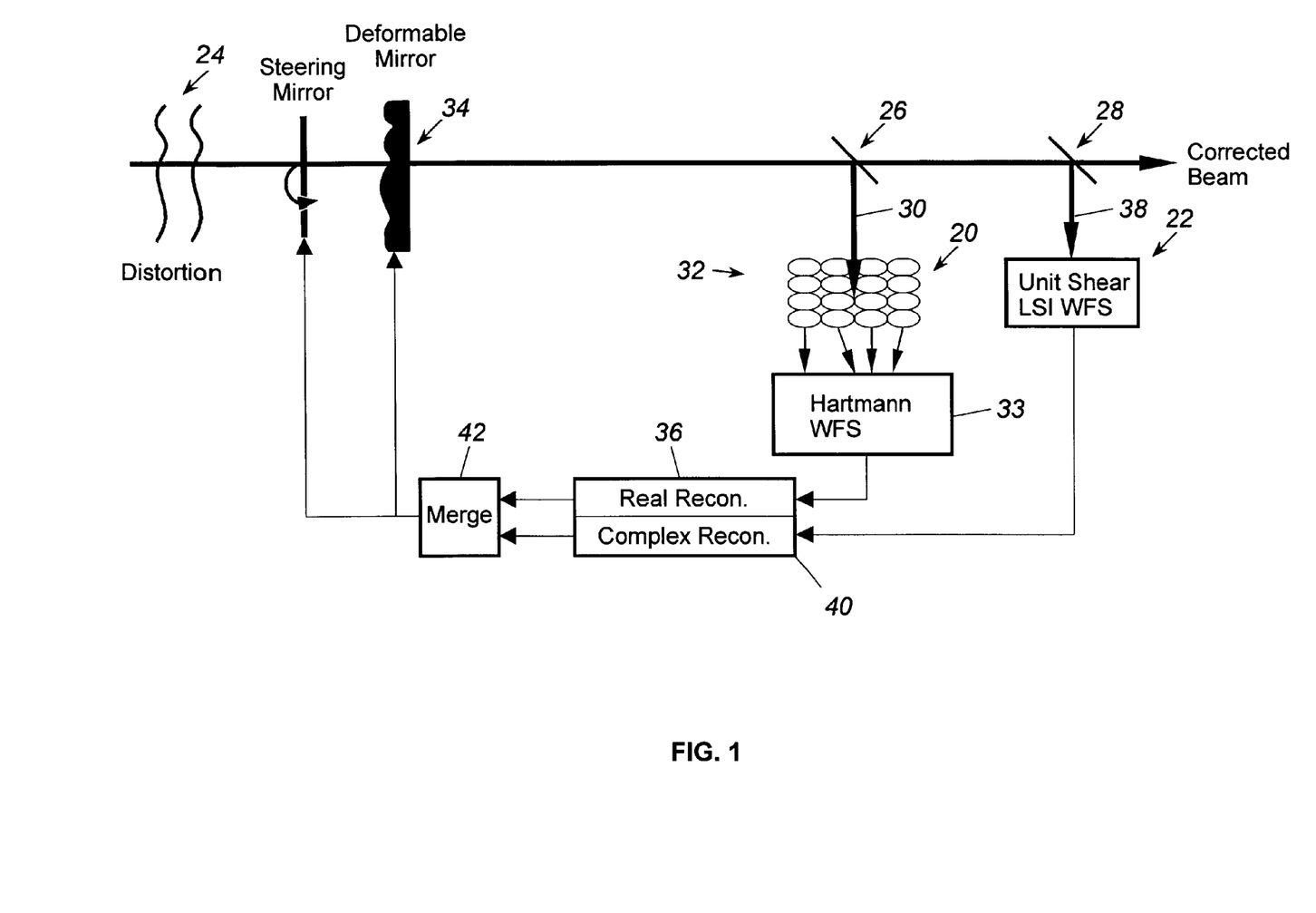
FIG. 1 is a block diagram of a dual sensor wavefront correction system in accordance with the present invention.
Figure 2:
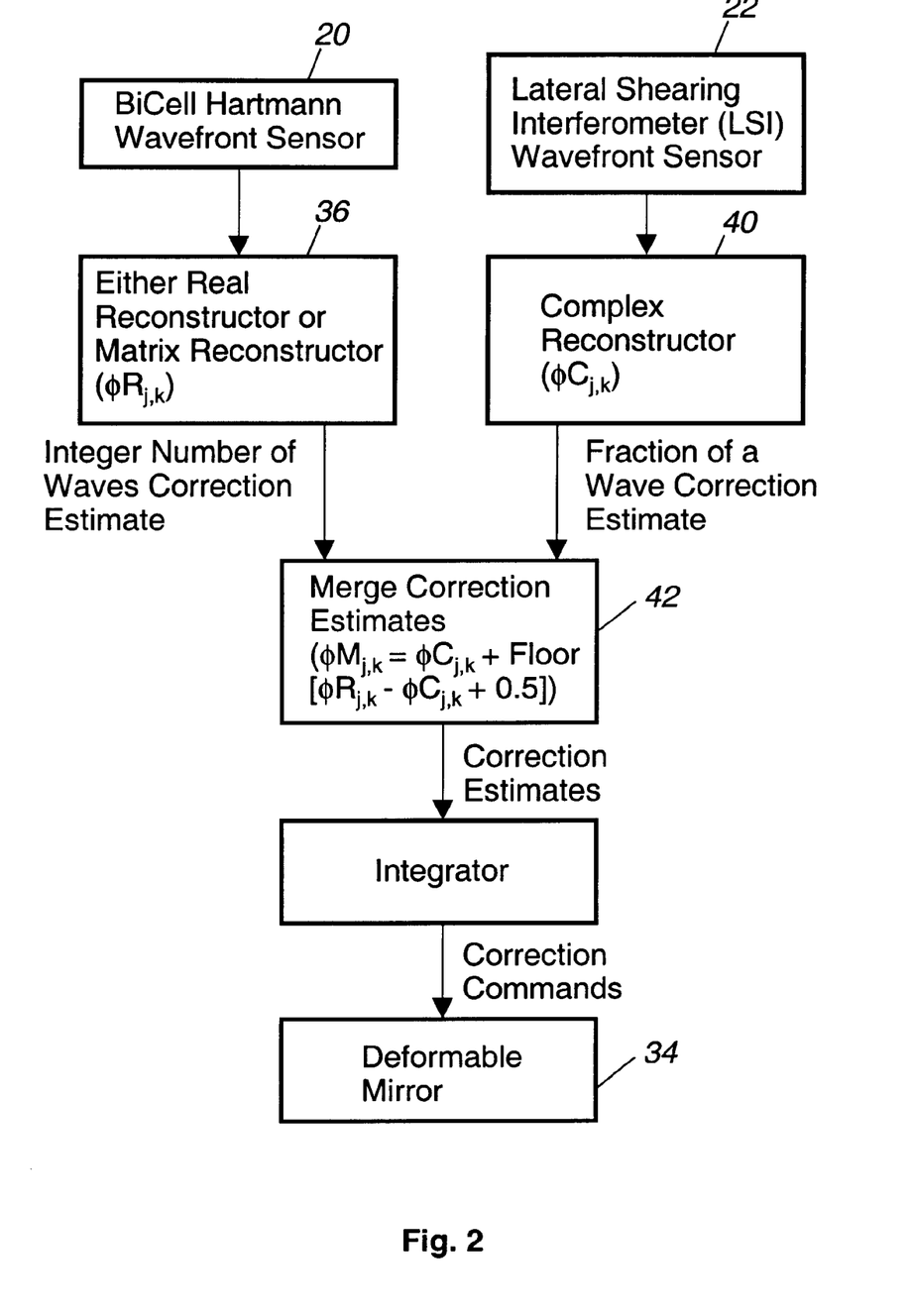
FIG. 2 is a general data flow diagram of the wavefront correction system in accordance with the present invention.

Referring to FIG. 1, the dual sensor wavefront correction system, in accordance with the present invention, allows the Hartmann wavefront sensor 20 and the unit shear LSI wavefront sensor 22 to view the wavefront 24, simultaneously by way of a pair of beam splitters 26, 28. The light along an optical path 30 is divided into a number of subapertures by way of a Hartmann mask with a matrix of holes or an array of lenslets, generally identified with the reference numeral 32. As shown in FIG. 1, an exemplary array of lenslets 32 is shown; each hole or lenslet defining a subaperture. One or more detectors, generally illustrated by a block 33 are disposed behind each of the lenslets. In the exemplary embodiment described, two detectors are disposed in the focal plane behind each subaperture forming a BiCell Hartmann wavefront sensor as illustrated in FIG. 2, for example. The number of lenslets is selected to correspond with the number of actuators included with the deformable mirror. As will be described in more detail below, a deformable mirror 34 with an exemplary 5×5 number of actuators is disclosed. As such, 5×4 X lenslets are required as well as 4×5 Y lenslets.

The output signals from the detectors 33 are electrical signals and are applied to a real reconstructor 36, discussed in detail below. As should be understood by those of ordinary skill in the art, the electrical output signals from the detectors 33 are converted to digital signals by way of an analog to digital converter and processed digitally. The digital signals may then be processed by various methods including by hardware, software or a combination thereof. In software implementations, the digital signals are directed to microprocessors or microcontrollers. Many processors are suitable for this purpose, for example Intel type Pentium microprocessor with 300 MHz processing speed or general purpose DSP processors.

Figure 3:
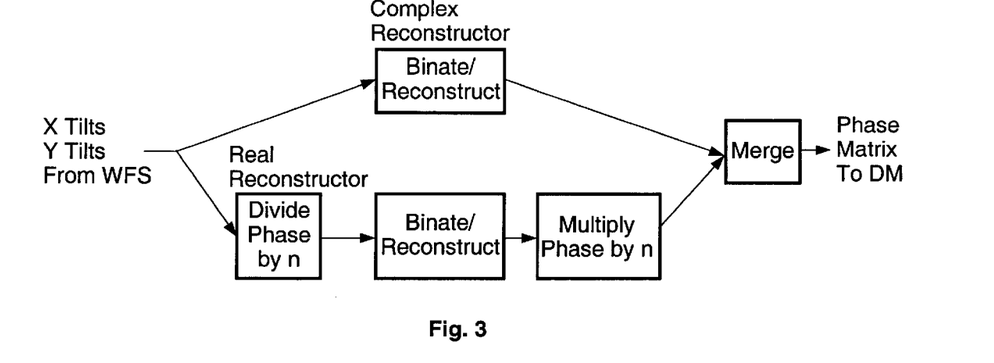
FIG. 3 is a more detailed data flow diagram of a portion of the data flow diagram illustrated in FIG. 2.

The light along the optical path 38 is applied to the unit shear LSI wavefront sensor 22. The output of the unit shear LSI wavefront sensor 22 is applied to an array of detectors (not shown) for converting the output optical signals from the unit shear LSI 22 to electrical signals. In general, the same number of detectors are selected for the unit shear LSI wavefront sensor as the Hartmann waveform sensor lenslets. Essentially, one detector is required between each of the deformable mirrors actuators 34, as will be discussed below. Thus, for the exemplary embodiment described and illustrated 5×4 X detectors are required and 4×5 Y detectors are required. As mentioned above, the output of the unit shear LSI wavefront sensor 22 is processed by a complex reconstructor 40. In accordance with an important aspect of the invention the output signals from the real reconstructor 36 and the complex reconstructor 40 are merged in a merge block 42 forming a merged complex reconstructor (MCR) as illustrated in FIGS. 1–3 to form a composite tilt signal. As will be discussed in more detail below the output signals from the real reconstructor 36 and the complex reconstructor 40 are combined in a synergistic manner. In particular, the output of the real reconstructor is used to provide an integer multiple of $2\pi$ to the composite actuator signals applied to the deformable mirror 34. Similarly, the output from the complex reconstructor 40 is used to provide the fractional portion of $2\pi$ to the composite actuator signals.

The merged complex reconstructor takes the subaperture tilt and intensity measurements from the wavefront sensors 20 and 22 and translates them into a matrix of deformable mirror actuator phase values. The conjugate of these phase values are applied to the deformable mirror 34. The merged complex reconstructor calculates the corrections for the deformable mirror 34 based on data from the unit shear LSI wavefront sensor 22 and the Hartmann wavefront sensor 20. This data (slopes) is characterized as complex numbers, with the magnitude set to the subaperture intensity and the phase set to the slope. If the phase of the input complex signal is multiplied by a number <<1, so that the complex signal is (nearly) real, then the complex reconstructor is referred to as a real reconstructor. If the reconstructor is used in both its complex and real forms, with the real reconstructor result used to determine the correction modulo $2\pi$ and the complex result used to determine the correction between plus and minus $\pi$, the combination of the two forms a merged complex reconstructor.

The merged complex reconstructor (MCR) offers several advantages, for example, the MCR requires a relatively small number of operations. More particularly, where a least squares fit algorithm would require order M operations for M channels, the MCR only requires order M while providing results that are within 5% of the least squares fit results. In addition, the MCR is robust; partially parallel; can be configured for various geometries; and automatically weights the data according to the signal to noise ratio.

Figure 4A:
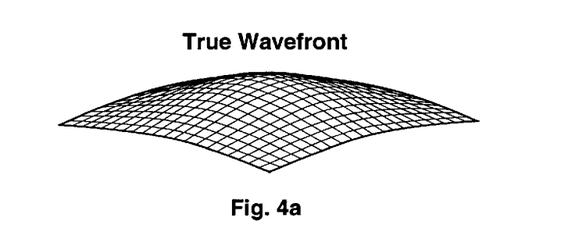
FIG. 4a is a perspective view of a wavefront without discontinuities.
Figure 4B:
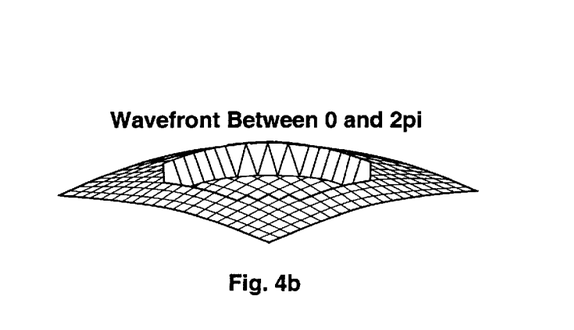
FIG. 4b is a perspective view of a wavefront with discontinuities.

The complex reconstructor 40 computes wavefront phase error results modulo $2\pi$. In a case, where the wavefront phase per subaperture exceeds $2\pi$ from maximum to minimum across the aperture, as illustrated in FIG. 4b, discontinuities in the output result. The real reconstructor 36 solves this problem by dividing the input phase errors by some number, n, which should be greater than the number of $2\pi$ cycles covered by the wavefront. In general, the real reconstructor 36 then performs the same manipulation as the complex reconstructor 40. The output phases are multiplied by n. The default value for n is 1000, which is large enough to make the phase values so small that the reconstructor becomes almost all real, which is the origin of its name.

With a monochromatic signal scintillated by some medium, it is possible for one wavecrest to wrap around and join the next wavecrest. This results in a total tilt of $2\pi$ around certain points called "branch points". Branch points necessarily have zero magnitude.

Branch points cause no difficulty for the complex reconstructor 40 because there is no ambiguity in the complex plane and the complex reconstructor 42 is only relied upon to output values between plus and minus $\pi$. However, a continuous deformable mirror 34 cannot properly adjust to a wavefront with branch points. The deformable mirror taking commands from a complex reconstructor 40 follow the conjugate of the slope part way around a branch point, but will have an opposite tilt in one area at a "branch cut". Branch cuts join pairs of branch points, or may start at a branch point and go out of the aperture. If the branch cuts are not too long (or too numerous) this may not cause a serious degradation since intensities in the neighborhoods of branch points are generally small. However, branch points can be a serious problem for the real reconstructor 36. Here, the algorithm averages the tilts to produce a continuous estimate of the wavefront, and so the errors caused by branch cuts are spread around the output matrix. The merged reconstructor uses the accuracy of the complex reconstructor 40 for corrections within plus and minus $\pi$, and removes $2\pi$ discontinuities using the real reconstructor 36.

Figure 5:
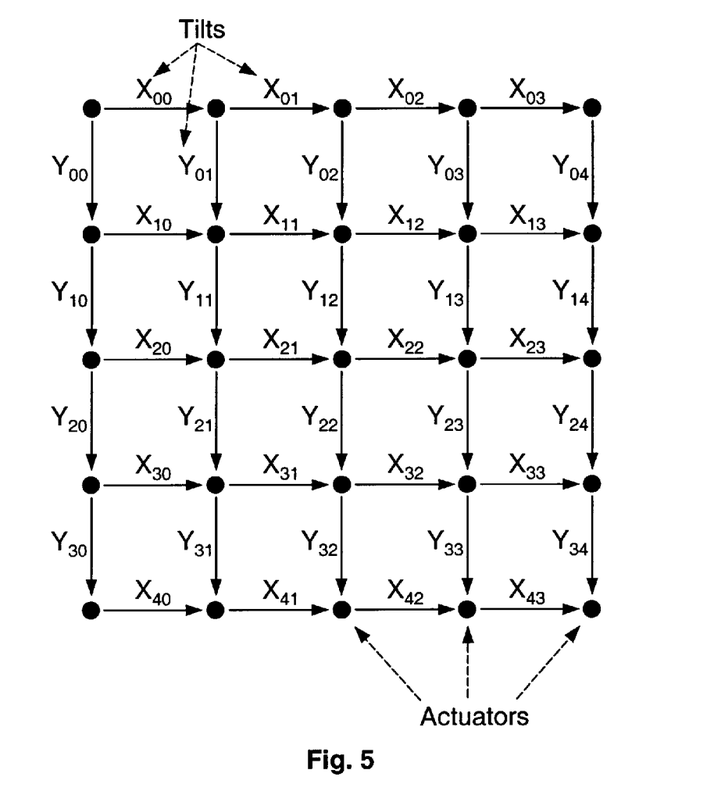
FIG. 5 is an illustration of an exemplary 5×5 matrix of actuators for a deformable mirror and a superimposed exemplary 5×4 matrix of X tilt values and a superimposed exemplary 4×5 matrix of Y tilt values.
Figure 6:
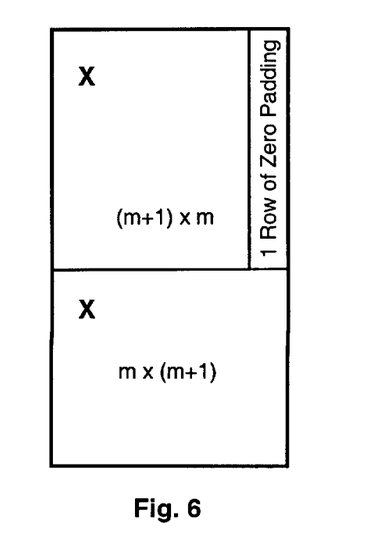
FIG. 6 is an illustration of an (m+1)×m matrix of tilt values and an m×(m+1) matrix of Y tilt values.

The input to the MCR consists of two sets of data: X tilts and Y tilts, representing the tilts between adjacent actuators which corresponds to tilts across subapertures of the wavefront sensors 20 and 22, as illustrated in the FIG. 5 below. As shown in FIG. 5, there are 5×4 X tilts, and 4×5 Y tilts. The data is stored as complex numbers in rectangular coordinates (a+ib). The magnitude of each number represents the intensity of light measured at the wavefront sensor 20 or 22 while the complex portion of each number represents the measured tilts. The data is saved in an xy matrix as shown in FIG. 5. Note that, because the submatrices are not quite square, a half row of zero padding is required for example as shown in FIG. 6. For (m+1)×m X tilts and m×(m+1) Y tilts, the XY matrix will be (2m+1)×(m+1).

Figure 7:
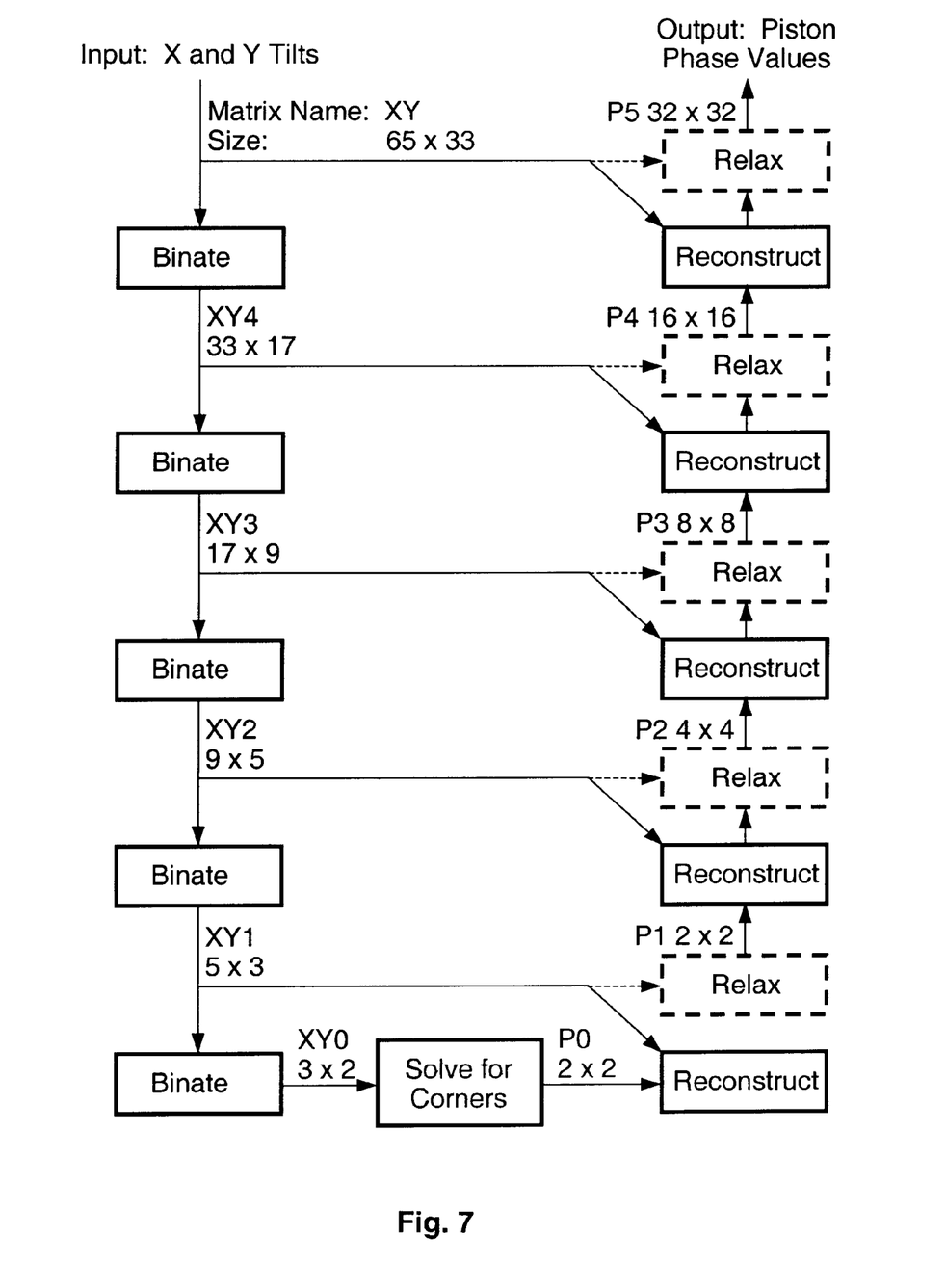
FIG. 7 is a data flow diagram of a binate/reconstruct algorithm for use with the present invention.

Both the complex and real reconstructors 40 and 36, respectively use a binate/reconstruct routine algorithm as generally illustrated in FIG. 7. This information is passed to a second bination step which determines tilts. The first bination step uses the XY tilt data to determine the tilts between actuators two apart. Between actuators four apart, and so on until only four numbers are left, representing tilts between the corners of the aperture. From these, the actuator values for the four corners are solved. Then, using this and the intermediate XY tilts from the bination steps, the values of the actuators within the aperture are found.

Figure 8:
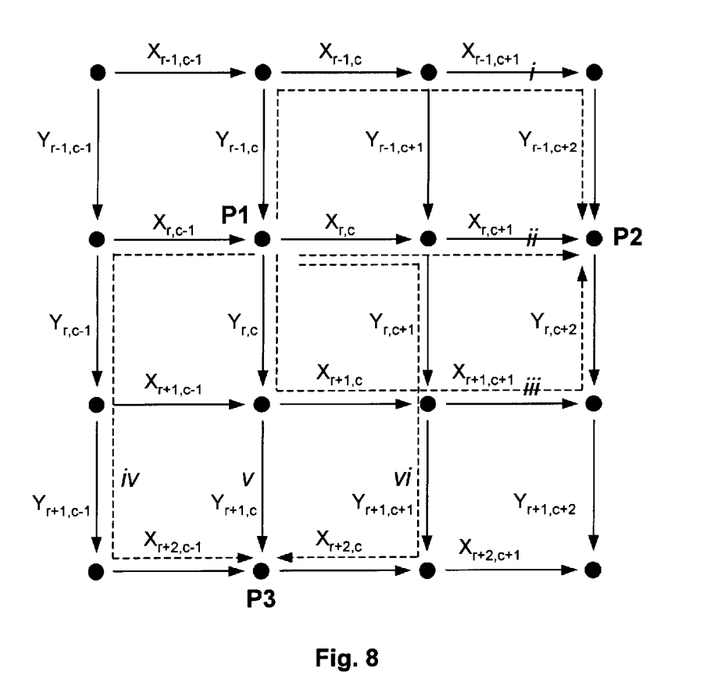
FIG. 8 is similar to FIG. 5 illustrating the computation paths for computing tilts for the deformable mirror actuators 21, P2 and P3.

As illustrated in FIG. 5 below, each bination step uses three paths to compute a new tilt between sets of two actuators (two apart). As the FIG. 8 illustrates, a new X tilt between actuators P1 and P2 is computed using the tilts over paths i, ii, and iii. A new Y tilt between actuators P1 and P3 is computed using the tilts over paths iv, v, and vi. When computing these tilts, magnitude is taken into account to weight high intensity (high signal to noise ratio) signals in accordance with the function as shown in the equation (1) below:

$$FS2(A, B) = \frac{A \cdot B}{|A| + |B|} \quad (1)$$

where A and B are complex numbers.
Rewriting A and B as $$A=|A|e^{ia}$$

$$B=|B|e^{ib}$$

Equation (1) can be rewritten as equation (2) below:

$$FS2(A, B) = \frac{|A||B|}{|A|+|B|}e^{i(a+b)} = Me^{i(a+b)} \quad (2)$$

The resultant phase is the sum of the phases and the magnitude is such that its multiplicative inverse is as illustrated in equation (3) below:

$$\frac{1}{M} = \frac{1}{|A|} + \frac{1}{|B|} \quad (3)$$

The result is a weighting in which a small value of A or B will lower the value of M.

In the notation of the FIG. 8, the computation of tilts is as follows:

Tilt between P1 and P2=
[weight i] [Path i tilt]+
[weight ii] [Path ii tilt]+
[weight iii] [Path iii tilt]=

$$FS2 [FS2(Y_{r-1,c}, X_{r-1,c}), FS2(X_{r-1,c+1}, Y_{r-1,c+2})]+FS2(X_{r,c}, X_{r,c+1})$$
$$FS2[S2(Y_{r,c}), FS2(X_{r+1,c+1}, Y_{r,c+2})]$$

The complex conjugate is required when the path requires negative tilt.

Figure 9:
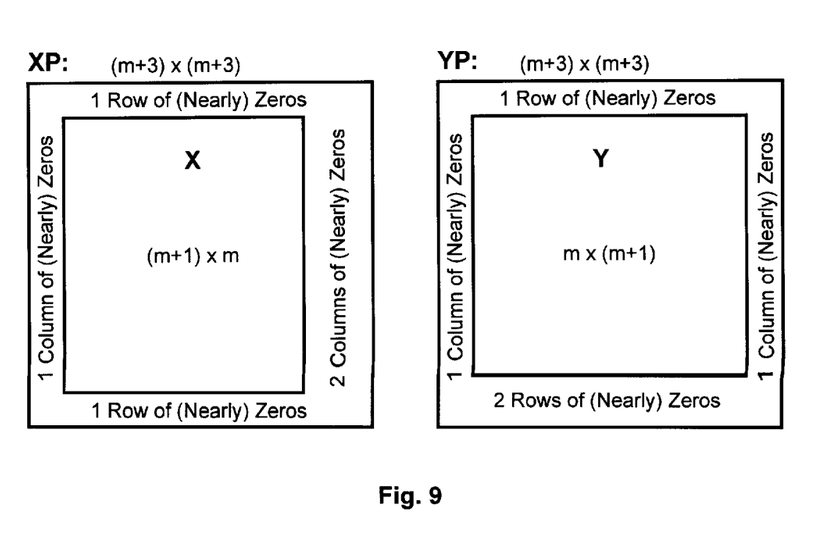
FIG. 9 is an illustration of x and y tilt matrices resulting from a bination processes in accordance with the present invention.

The bination process is carried out across the aperture. The X and Y data are separated from the XY matrix and each is embedded into a matrix with a border of (nearly) zeros, as shown in FIG. 9. This allows border elements to use identical processing as interior elements even though they have fewer than three paths. The nearly zero values of the borders give these extra paths essentially zero weight.

If the input XY matrix for the bination process is of size (2m+1)×(m+1), after bination the size of the new XY matrix is $$\left(2\frac{m}{2}+1\right) \times \left(\frac{m}{2}+1\right)$$

Figure 10:
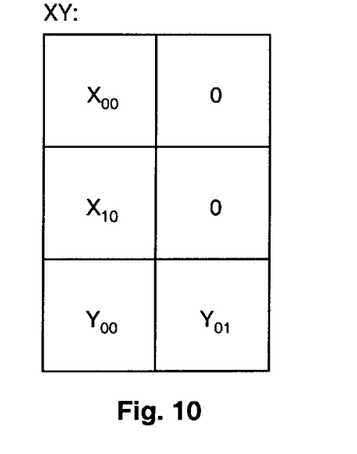
FIG. 10 is an xy matrix representing tilt values across a portion of an aperture.

The bination process is repeated until we are left with a 3×2 matrix, with four significant tilts, as shown in FIG. 10. These represent the tilts across the edges of the aperture as shown in FIG. 11.

Figure 11:
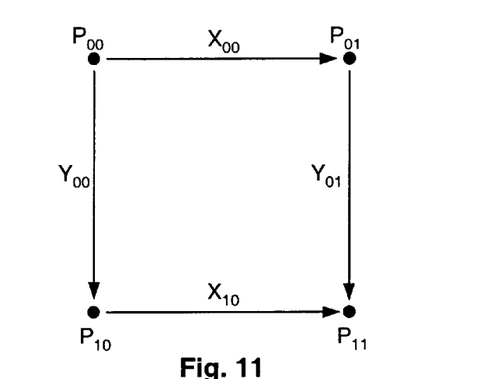
FIG. 11 is the tilt values illustrated in FIG. 10 superimposed on a matrix of corner actuator tilt values.

From the data in FIG. 11, the relative values for the corner actuators are solved. Setting $P_{00}=1e_{io}$ arbitrarily; the tilt values for the corner actuators can be computed as shown in equation (4).

$$P_{11}=FS2(X_{00}, Y_{01})+FS2(Y_{00}, X_{10}) \quad (4)$$

The magnitude is normalized to one. The other two actuators are then solved using vector sums to find a weighted average for the phase angle as given in equation (5)

$$P_{10}=P_{00} \cdot Y_{00}+X_{10} \cdot P_{11} \quad P_{01}=P_{00} \cdot X_{00}+Y_{01} \cdot P_{11} \quad (5)$$

then normalizing the magnitudes to one. The multiplication $P_{00}$ is not strictly necessary, since $P_{00}$ is equal to one.

Figure 12:
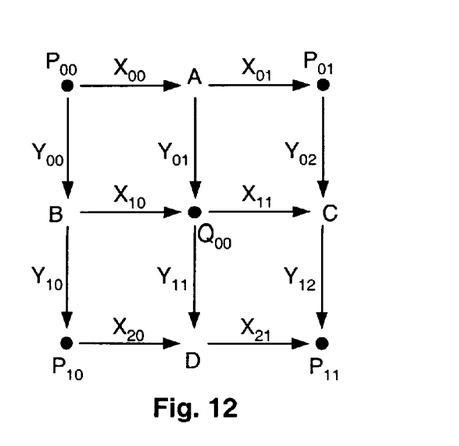
FIG. 12 is similar to FIG. 10 but further illustrating how the center actuator values are determined during a reconstruct step in the complex reconstructor.

Once the phases for the four corners are solved, reconstruction can begin. First the center actuator is found, as shown in FIG. 12 using the four corner actuator values and the X and Y tilt data from the input to the final bination step.

With the notation shown in FIG. 10, the four intermediate values are computed as shown in equations (6)–(9):

$$A=P_{00} \cdot X_{00}+P_{01} \cdot X_{01}$$

$$B=P_{00} \cdot Y_{00}+P_{10} \cdot Y_{10}$$

$$C=P_{01} \cdot Y_{02}+P_{11} \cdot Y_{12}$$

$$D=P_{10} \cdot X_{20}+P_{11} \cdot X_{21} \quad (6-9)$$

These results are used to find the center actuator in accordance with equation (10):

$$Q_{00}=FS2(A, Y_{01})+FS2(B,X_{10})+FS2(C,X_{11})+FS2(D, Y_{11}) \quad (10)$$

and then normalize the magnitude to one.

Figure 13:
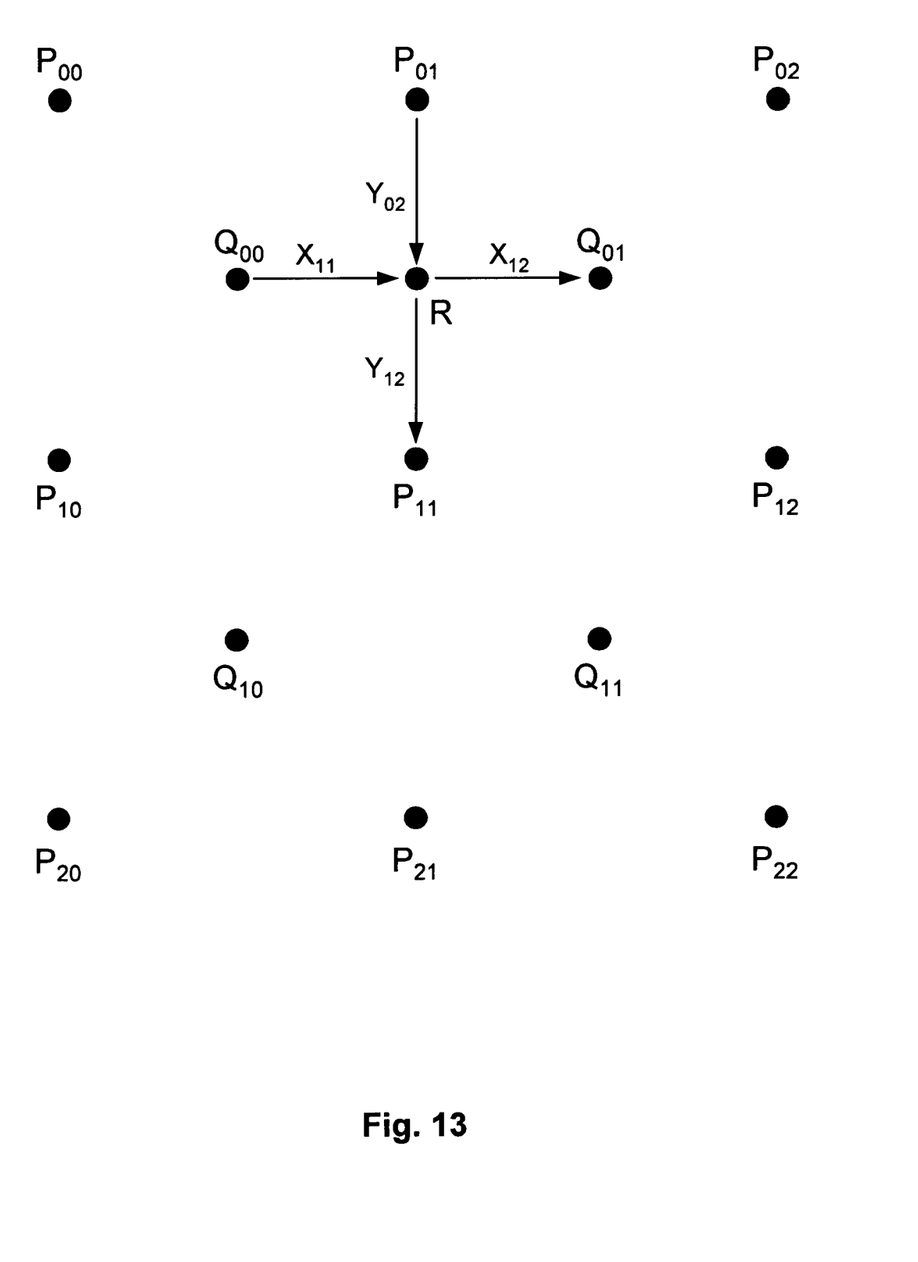
FIG. 13 illustrates how the edge actuator values are determined during a reconstruction step in the complex reconstructor.

The actuator values along the border—in positions A, B, C and D—are then found in the same way, using the values for the P actuators and the newly calculated value for $Q_{00}$. Because A, B, C, and D are along the border the equations will have one term missing. (This can be handled in by adding a border of zeros around the matrices of X tilts, Y tilts, and known actuator values.) A schematic for the next reconstruction step is shown below, where the P actuator values are known from the previous reconstruction step, and the Q actuator values are found as described above. Using the notation of the schematic, values for actuators between the P's and Q's, for example R, are determined by equation (11)

$$R=P_{01} \cdot Y_{02}+Q_{00} \cdot X_{11}+Q_{01} \cdot X_{12}+P_{11} \cdot Y_{12} \quad (11)$$

The magnitude of R is then normalized. Other actuator values between the P's and Q's are found in the same way. Actuators along the border will have one term missing. This may be handled by adding a border of zeros around the values of x tilts, y tilts and known actuator values. Once the matrix is filled in, the reconstruction steps are repeated, filling in actuators between those already determined. This is repeated until the matrix grows to match the number of actuators used by the deformable mirror 34.

Optionally, after the matrix is filled in for each reconstruction step, a "relaxation" step may be carried out. Here, each actuator phase is recomputed by taking each of its four neighbors times the appropriate tilt and computing the average (by vector sums). This may be repeated a number of times to get a more noise optimum result.

The merge operation takes the resulting phase matrices from the Real and Complex representing an actuator position), and computes an average phase bias between the complex and real reconstructors as given by equation (12):

$$\text{bias} = \sum_r \sum_c e^{i\left(P_{r,c}^{Complex}-P_{r,c}^{Real}\right)} \quad (12)$$

where $P_{r,c}^{Real}$ and $P_{r,c}^{Complex}$ are the Real and Complex reconstructor actuator values, respectively, at position r,c. The resulting phase angle of the complex bias is added to the Real reconstructor's actuator values so that its phases match the complex phases as closely as possible as given by equation (13):

$$P_{r,c}^{Real}=P_{r,c}^{Real}+arg(\text{bias}) \quad (13)$$

where arg(·) finds the phase angle of the complex argument. The merge operation then computes as set forth in equation (14)

$$P_{r,c}^{MCR} = \text{ModAng}(P_{r,c}^{Complex} - P_{r,c}^{Real}) + P_{r,c}^{Real} \qquad (14)$$

where ModAng(·) is the modulo value of the argument between $-\pi$ and $\pi$. The result places the merged actuator value at that found by the complex reconstruction algorithm, plus $2\pi n$, for interger n, as determined by the real reconstructor. This gives the merged reconstructor the precision of the complex reconstructor and the continuity of the real reconstructor (to minimize the number of $2\pi$ discontinuities). The mean piston is then removed from the result to obtain the merged reconstructor.

If a steering mirror is included in the system, the average X and Y-tilt signals can be removed from the correction terms sent to the deformable mirror and sent to the sterring mirror instead.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A wavefront correction system for compensating for distortion in an optical wavefront comprising:

a first wavefront sensor system which includes a first beam splitter for diverting a portion of said wavefront to said first wavefront sensor system, said first wavefront sensor system also including a Hartmann sensor and a real reconstructor for receiving a portion of said optical wavefront and determining the distortion in a wavefront with a continuous phase and providing a first correction signal;

a second wavefront sensor system which includes a second beam splitter for diverting a portion of said wavefront to said second wavefront sensor system, said second wavefront sensor system also including a lateral shear interferometer (LSI) and a complex reconstructor for receiving a portion of said optical wavefront and providing a second correction signal representing phase discontinuities of said distorted wavefront signal;

means for combining said first and second correction signals and providing a composite correction signal; and a deformable mirror having a plurality of actuators for receiving said composite correction signal and compensating for the distortion in said optical wavefront as a function of said composite correction signal.

2. The wavefront sensor system as recited in claim 1, wherein said lateral shear interferometer is a unit shear lateral shear interferometer.

3. The wavefront correction system as recited in claim 1, further including a steering mirror for receiving at least a portion of said composite correction signal and aiming said wavefront at said deformable mirror as a function of said composite correction signal.

4. A method for compensating for the distortion in an optical wavefront comprising the steps of:

(a) compensating for distortions in a wavefront with a continuous phase by way of a real reconstructor and providing a first correction signal;

(b) providing a second correction signal for phase discontinuities of said distorted wavefront signal by way of a complex reconstructor;

(c) combining said first and second correction signals and providing composite correction signals; and (d) providing a deformable mirror having a plurality of actuators and coupling said composite correction signal thereto for compensating for the distortion in the optical wavefront.

5. The method as recited in claim 4, further including the step of providing a steering mirror for receiving at least a portion of said composite correction signal and aiming said wavefront at said deformable mirror as a function of said composite correction signals.

* * * * *